(12) United States Patent
Shin et al.

(10) Patent No.: US 7,907,106 B2
(45) Date of Patent: Mar. 15, 2011

(54) LIQUID CRYSTAL DISPLAY AND DRIVING METHOD THEREOF

(75) Inventors: Kyoung-Ju Shin, Yongin-si (KR);
Chong-Chul Chai, Seoul (KR);
Cheol-Woo Park, Suwon-si (KR);
Young-Chol Yang, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1363 days.

(21) Appl. No.: 11/302,098

(22) Filed: Dec. 12, 2005

(65) Prior Publication Data
US 2007/0291190 A1 Dec. 20, 2007

(30) Foreign Application Priority Data
Feb. 26, 2005 (KR) .................. 10-2005-0016220

(51) Int. Cl.
*G09G 3/36* (2006.01)
(52) U.S. Cl. .............. 345/87; 345/98; 345/100; 345/102
(58) Field of Classification Search .................. 345/87, 345/98, 100, 102
See application file for complete search history.

(56) References Cited

U.S. PATENT DOCUMENTS

| 6,075,505 | A  * | 6/2000 | Shiba et al. ................... 345/87 |
| 6,229,531 | B1 * | 5/2001 | Nakajima et al. ............. 345/205 |
| 6,429,841 | B1 | 8/2002 | Lee |
| 6,456,268 | B1 * | 9/2002 | Takeda ............................ 345/92 |
| 6,573,835 | B2 * | 6/2003 | Irizarry et al. ............. 340/573.4 |
| 7,126,657 | B2 * | 10/2006 | Okumura ........................ 349/114 |
| 7,362,321 | B2 * | 4/2008 | Kumada et al. ................ 345/209 |
| 2007/0159451 | A1 * | 7/2007 | Daly ............................... 345/102 |

FOREIGN PATENT DOCUMENTS

| CN | 1361447 | 7/2002 |
| CN | 1504984 | 6/2004 |
| JP | 59-119328 | 7/1984 |
| JP | 63-095420 | 4/1988 |

(Continued)

*Primary Examiner* — Amr Awad
*Assistant Examiner* — Leonid Shaprio
(74) *Attorney, Agent, or Firm* — F. Chau & Associates, LLC

(57) ABSTRACT

A liquid crystal display (LCD) and a driving method thereof are provided. The LCD comprises a liquid crystal panel having a gate line, a data line, and a pixel defined by the intersection of the gate line and the data line; a grayscale voltage generating unit for generating a grayscale voltage; a driving voltage generating unit for generating a gate off voltage, a positive polarity gate on voltage, and a negative polarity gate on voltage, wherein the negative polarity gate on voltage is lower than the positive polarity gate on voltage; a gate driving unit for supplying the gate line with at least one of the positive polarity gate on voltage and the negative polarity gate on voltage; a data driving unit for supplying the pixel with a data voltage, wherein the data driving unit is supplied with the grayscale voltage from the grayscale voltage generating unit; and a signal control unit for controlling the data driving unit so that a positive polarity data voltage and a negative polarity data voltage are alternately applied to the pixel, and for controlling the gate driving unit so that the positive polarity gate on voltage is applied to the pixel supplied with the positive polarity data voltage and the negative polarity gate on voltage is applied to the pixel supplied with the negative polarity data voltage. Accordingly, the degree of flicker and image sticking is reduced.

20 Claims, 13 Drawing Sheets

FOREIGN PATENT DOCUMENTS

| | | |
|---|---|---|
| JP | 63-175889 | 7/1988 |
| JP | 04-142592 | 5/1992 |
| JP | 04-223428 | 8/1992 |
| JP | 04-309926 | 11/1992 |
| JP | 5-265042 | 10/1993 |
| JP | 06-003647 | 1/1994 |
| JP | 09-258174 | 10/1997 |
| JP | 2003-248465 | 9/2003 |
| KR | 1999-0060000 | 7/1999 |
| KR | 2002-0096400 | 12/2002 |
| TW | 521244 | 2/2003 |
| WO | WO2004046793 | 6/2004 |

\* cited by examiner

LIQUID CRYSTAL DISPLAY AND DRIVING METHOD THEREOF

CROSS-REFERENCE TO RELATED APPLICATION

This application claims priority to Korean Patent Application No. 2005-0016220, filed on Feb. 26, 2005, the content of which is hereby incorporated by reference in its entirety.

BACKGROUND OF THE INVENTION

1. Field of the Invention

The present invention relates to a liquid crystal display (LCD) and a driving method thereof. More particularly, the present invention relates to an LCD and a driving method that reduces the degree of flicker and image sticking.

2. Description of the Related Art

An LCD comprises a liquid crystal panel having a thin film transistor (TFT) substrate on which a TFT is formed, a color filter substrate on which a color filter layer is formed, and a liquid crystal layer disposed between the two substrates. Since the liquid crystal panel is not self-emissive, a backlight unit may be provided in the rear of the TFT substrate. Light emitted from the backlight unit can pass through the liquid crystal panel. The transmittance of light through the liquid crystal panel depends on the alignment of the liquid crystal.

A gate line and a data line provided on the TFT substrate intersect each other, thereby forming a pixel. Each pixel is connected to the corresponding TFT. A gate on voltage Von is applied to the gate line, and therefore the TFT is turned on, thereby a data voltage Vd applied through the data line is applied across the pixel. The alignment of the liquid crystal varies in accordance with an electric field formed between a pixel voltage Vp across the pixel and a common voltage Vcom formed in a common electrode of the color filter substrate. The data voltage Vd is applied by frame with opposite polarity.

The data voltage Vd applied across the pixel is dropped by a parasitic capacitance Cgs formed between the gate electrode and the source electrode, thereby generating the pixel voltage Vp. The voltage difference between the data voltage Vd and the pixel voltage Vp is known as the kickback voltage Vkb.

The kickback voltage Vbk varies according to the grayscale and polarity, thereby causing the pixel voltage Vp to vary by frame. This induces both flicker caused by a brightness difference and image sticking (in which a fixed image remains immediately after its display as if it had been burnt in) caused by a residual DC voltage. Flicker and image sticking cause the quality of the display to deteriorate.

A need therefore exists for an LCD and a driving method that reduce the degree of flicker and image sticking.

SUMMARY OF THE INVENTION

In at least one exemplary embodiment of the present invention an LCD comprises a liquid crystal panel having a gate line, a data line, and a pixel defined by the intersection of the gate line and the data line, a grayscale voltage generating unit for generating a grayscale voltage; a driving voltage generating unit for generating a gate off voltage, a positive polarity gate on voltage, and a negative polarity gate on voltage, wherein the negative gate polarity gate on voltage is lower than the positive polarity gate on voltage; a gate driving unit for supplying the gate line with the positive polarity gate on voltage or the negative polarity gate on voltage; a data driving unit for supplying the pixel with a data voltage, wherein the data driving unit is supplied with the grayscale voltage from the grayscale voltage generating unit; and a signal control unit for controlling the data driving unit so that a positive polarity data voltage and a negative polarity data voltage are applied alternately to the pixel, and for controlling the gate driving unit so that the positive polarity gate on voltage is applied to the pixel supplied with the positive polarity data voltage and the negative polarity gate on voltage is applied to the pixel supplied with the negative polarity data voltage.

According to an exemplary embodiment of the present invention, the difference between the negative polarity gate on voltage and the gate off voltage is about 50 to about 80% of the difference between the positive polarity gate on voltage and the gate off voltage.

According to an exemplary embodiment of the present invention, the adjacent pixels disposed in an extension direction of the gate line are connected to the different gate lines.

According to an exemplary embodiment of the present invention, the signal control unit controls the gate driving unit so that the positive polarity gate on voltage and the negative polarity voltage are applied to the adjacent gate lines, respectively.

According to an exemplary embodiment of the present invention, the signal control unit controls the data driving unit so that the same polarity of data voltage is applied to the pixels connected to the same gate line.

According to an exemplary embodiment of the present invention, the image refreshment rate is higher than 120 Hz.

According to an exemplary embodiment of the present invention, the negative polarity gate on voltage has a stepwise distribution that the negative polarity gate on voltage is reduced over time.

According to an exemplary embodiment of the present invention, the positive polarity gate on voltage has a stepwise distribution that the positive polarity gate on voltage is reduced over time.

According to an exemplary embodiment of the present invention, the liquid crystal panel further comprises a liquid crystal layer, and a liquid crystal in the liquid crystal layer has a negative dielectric anisotropy and aligns vertically in the absence of an electromagnetic field.

According to an exemplary embodiment of the present invention, the LCD further comprises a lightsource unit disposed in the rear of the liquid crystal panel and repetitively supplying red, green and blue colors of light to the liquid crystal panel sequentially by frame.

According to an exemplary embodiment of the present invention, an image refreshment rate is higher than 180 Hz.

According to at least one exemplary embodiment of the present invention a driving method of an LCD including a liquid crystal panel in which a pixel is defined by an intersection of a gate line and a data line comprises applying a positive polarity gate on voltage across the pixel supplied with a positive polarity data voltage, and applying a negative polarity gate on voltage across the pixel supplied with the negative polarity data voltage, wherein the negative polarity gate on voltage is lower than the positive polarity gate on voltage.

According to an exemplary embodiment of the present invention, a difference between the negative polarity gate on voltage and a gate off voltage is about 50 to about 80% of the difference between the positive polarity gate on voltage and the gate off voltage.

According to an exemplary embodiment of the present invention, the adjacent gate lines are supplied with the gate on voltages having opposite polarity, and the adjacent data lines are supplied with the data voltages having opposite polarity.

BRIEF DESCRIPTION OF THE DRAWINGS

The present invention will become more apparent to those of ordinary skill in the art when descriptions of exemplary embodiments thereof are read with reference to the accompanying drawings, of which.

DETAILED DESCRIPTION OF EXEMPLARY EMBODIMENTS

Hereinafter exemplary embodiments of the present invention will be described with reference to the accompanying drawings.

Figure 1:
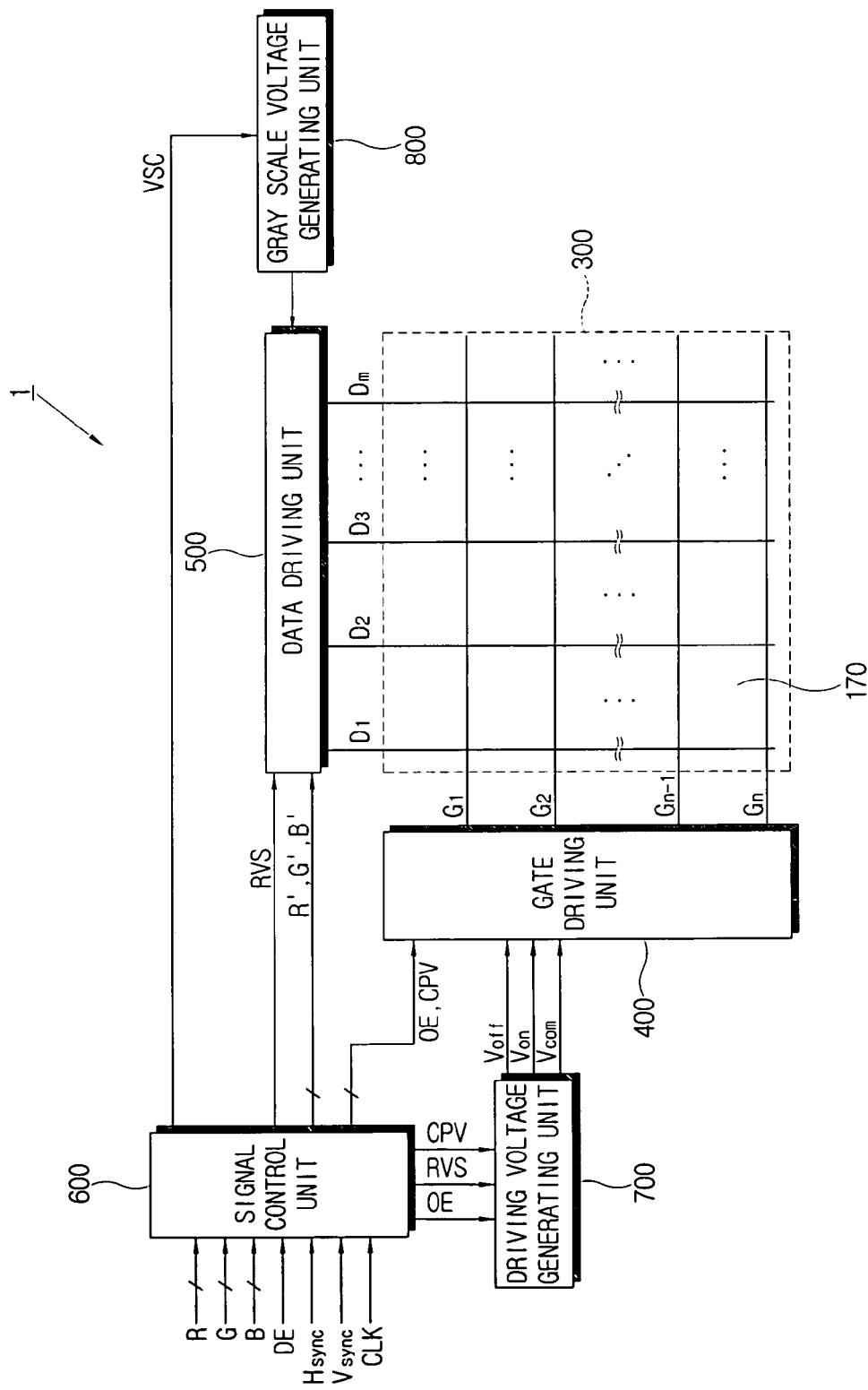
FIG. 1 is a block diagram of a liquid crystal display (LCD) according to a first exemplary embodiment of the present invention.

FIG. 1 is a block diagram of an LCD according to a first exemplary embodiment of the present invention. As shown in FIG. 1, an LCD 1 comprises a liquid crystal panel 300 (shown by dotted line), a gate driving unit 400, and a data driving unit 500 connected to the liquid crystal panel 300. In accordance with the first exemplary embodiment of the present invention, the LCD 1 further comprises a driving voltage generating unit 700 connected to the gate driving unit 400, a grayscale voltage generating unit 800 connected to the data driving unit 500, and a signal control unit 600 for controlling the gate driving unit 400, data driving unit 500, voltage generating unit 700 and grayscale voltage generating unit 800.

Figure 2:
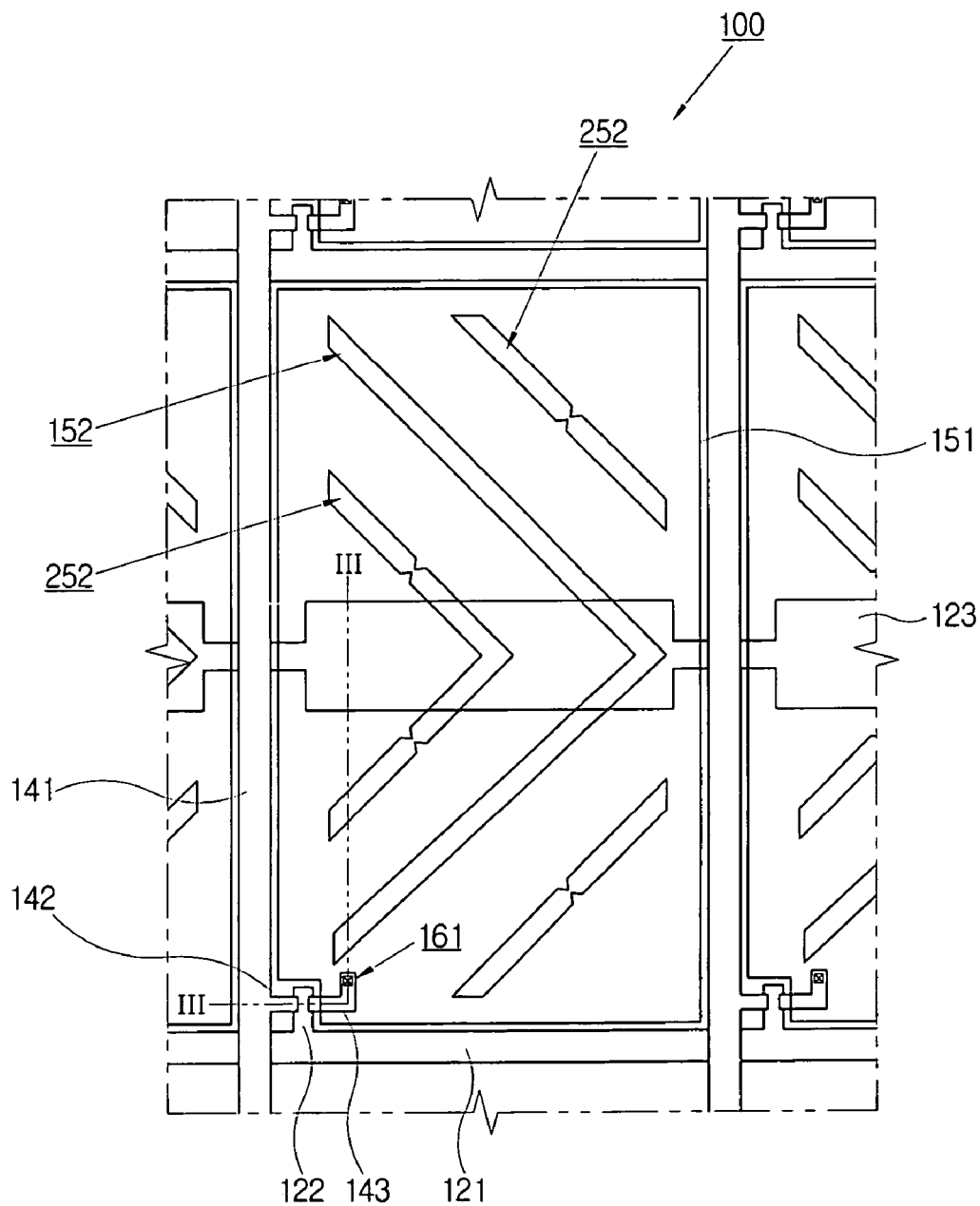
FIG. 2 is a schematic view of the LCD according to the first exemplary embodiment of the present invention.
Figure 3:
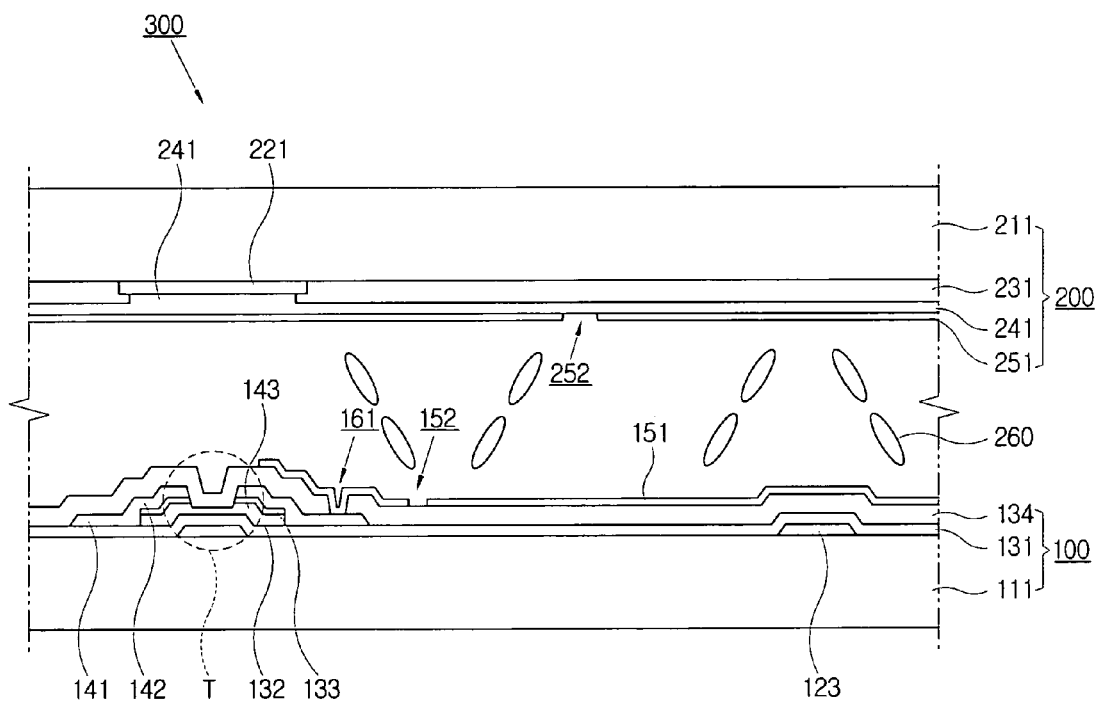
FIG. 3 is an exemplary sectional view taken along the □-□ line of FIG. 2.
Figure 4:
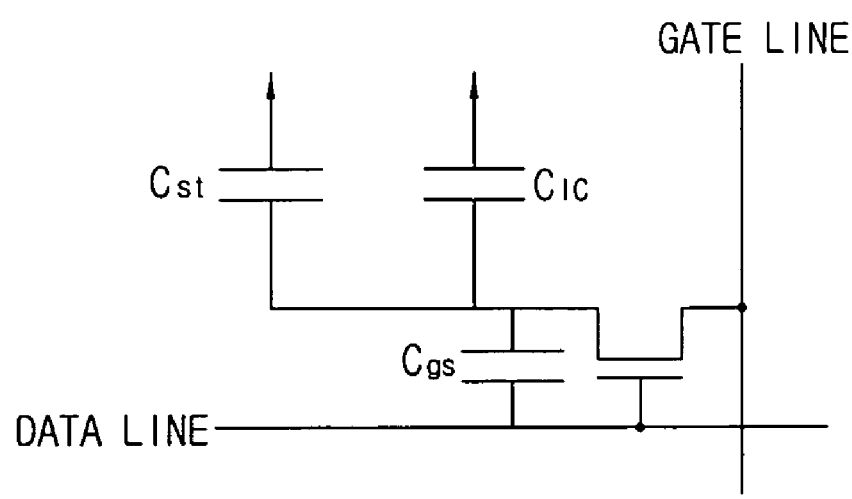
FIG. 4 is an equivalent circuit diagram of a pixel.

FIG. 2 is a schematic view of the LCD according to the first exemplary embodiment of the present invention. FIG. 3 is an exemplary sectional view taken along the □-□ line of FIG. 2.

According to the first exemplary embodiment of the present invention, the liquid crystal panel 300 comprises a TFT substrate 100, as shown in FIGS. 2 and 3. As shown in FIG. 3, the liquid crystal panel 300 further comprises a color filter substrate 200 disposed opposing the TFT substrate 100 and a liquid crystal layer 260 interposed therebetween.

As shown in FIG. 2, a gate wiring 121, 122 and 123 is formed on a first insulating substrate 111 of the TFT substrate 100. It should be appreciated that any means for forming the gate wiring 121, 122, 123 should be suitable for implementing the invention, including metallic single layer or multi layer. The gate wiring 121, 122 and 123 comprises a gate line 121 extended in a transverse direction, a gate electrode 122 of a TFT "T" (see FIG. 3) connected to the gate line 121, and a common electrode line 123 forming a storage capacitance by overlapping a pixel electrode 151.

Agate insulating layer 131 formed on the first insulating substrate 111 covers the gate wiring 121, 122 and 123. In at least one exemplary embodiment of the invention, the gate insulating layer 131 comprises silicon nitride (SiNx).

A semiconductor layer 132 is formed on the gate insulating layer 131 of the gate electrode 122. In at least one exemplary embodiment of the present invention, the semiconductor layer 132 comprises amorphous silicon. An ohmic contact layer 133 is formed on the semiconductor layer 132. Preferably, the ohmic contact layer 133 comprises silicide or n+hydrogenated amorphous silicon heavily doped with n type impurities. The ohmic contact layer 133 above the gate electrode 122 is divided into two parts.

As shown in FIG. 3, a data wiring 141, 142 and 143 is formed on the ohmic contact layer 133 and the gate insulating layer 131. It should be appreciated that any means for forming the data wiring 141, 142 and 143 should be suitable for implementing the invention, including metallic single layer or multi layer. The data wiring 141, 142, 143 comprises a data line 141 extending in a vertical direction and intersecting the gate line 121, thereby defining: a pixel, a drain electrode 142 branching out from the data line 141 and extending onto an upper part of the ohmic contact layer 133, and a source electrode 143 separate from the drain electrode 142 and formed on the ohmic contact layer 133 opposite to the drain electrode 142.

A passivation layer 134 is formed on the data wiring 141, 142, 143 and the semiconductor layer 132, as shown in FIG. 3. In at least one exemplary embodiment of the present invention, the passivation layer 134 comprises silicon nitride, a-Si:C:O layer or a-Si:O:F layer deposited by a plasma enhanced chemical vapor deposition (PECVD) process, and an acrylic based organic insulating layer. A contact hole 161 exposing the source electrode 143 is formed on the passivation layer 134.

The pixel electrode 151 is formed on the passivation layer 134. The pixel electrode 151 typically comprises a transparent conductive material. Transparent conductive materials that are suitable for implementing the invention include, but are not limited to, ITO (indium tin oxide) and IZO (indium zinc oxide).

The pixel electrode 151 is patterned with a pixel electrode cut out pattern 152. The pixel electrode cut out pattern 152 is formed to section the liquid crystal layer 260 into several domains according to a common electrode cut out pattern 252.

A black matrix 221 and a color filter layer 231 are formed on a surface of the second insulating substrate 211 of the color filter substrate 200 facing the first insulating substrate 111. The black matrix 221 borders a matrix array of red, green and blue filters, and blocks direct light to the TFT T of the TFT substrate 100. In an exemplary embodiment of the present invention, the black matrix 221 comprises a photosensitive organic material containing black pigment. Any black pigment should be suitable for implementing the invention, such as carbon black or titanium oxide.

The color filter layer 231 includes a matrix array of red (R), green (G), and blue (B) filters that are bordered by the black matrix 221. The color filter layer 231 provides colors to the light emitted from a lightsource and passing through the liquid crystal layer 260. In an exemplary embodiment of the present invention, the color filter layer 231 comprises a photosensitive organic material.

An overcoat layer 241 is formed on the color filter layer 231 and the portion of the black matrix 221 not covered by the color filter layer 231. The overcoat layer 241 flattens the surface of the color filter layer 231, and protects the color filter layer 231. In an exemplary embodiment of the present invention, the overcoat layer 241 comprises as acrylic based epoxy material.

A common electrode 251 is formed on the overcoat layer 241. The common electrode 251 comprises a transparent conductive material. Transparent conductive materials suitable for implementing the present invention include, but are not limited to, ITO (indium tin oxide) and IZO (indium zinc oxide). The common electrode 251 supplies a voltage directly to the liquid crystal layer 260 using the pixel electrode 151 of the TFT substrate. The common electrode 251 is patterned according to the common electrode cut out pattern 252. The common electrode cut out pattern 252 sections the liquid crystal layer. 260 into several domains according to the pixel electrode cut out pattern 152 of the pixel electrode 151. It should be understood that the pixel electrode cut out pattern 152 and the common electrode cut out pattern 252 can be formed in various arrangements. For example, the pixel electrode cut out pattern 152 and the common electrode cut out pattern 252 may be formed perpendicular to each other.

The liquid crystal layer 260 is interposed between the TFT substrate 100 and the color filter substrate 200. In at least one exemplary embodiment of the present invention, the liquid crystal layer 260 has a VA (vertically aligned) mode, so the liquid crystal molecules normally align at right angles to the substrates 100 and 200. Since the liquid crystal molecules have negative dielectric anisotropy, the liquid crystal molecules lie parallel to the substrates 100 and 200 in the presence of an electromagnetic field. (If the pixel electrode cut out pattern 152 and the common electrode cut out pattern 252 are not formed, the liquid crystal molecules align without regularity, thereby generating defects called disclination lines.) When the voltage is applied to the liquid crystal layer 260, the pixel electrode cut out pattern 152 and the common electrode cut out pattern 252 form a fringe field, thereby determining a declination angle for an orientation of the liquid crystal molecule. The liquid crystal layer 260 is sectioned into several domains according to an arrangement of the pixel electrode cut out pattern 152 and the common electrode cut out pattern 252.

The driving voltage generating unit 700 generates a gate on voltage Von for turning on the TFT T, a gate-off voltage Voff for turning off the TFT T, and a common voltage Vcom applied to the common electrode 251. In at least one exemplary embodiment of the present invention, the gate on voltage Von comprises a positive polarity gate on voltage Von(+) and a negative polarity gate on voltage Von(−) that is lower than the positive polarity gate on voltage Von(+).

The grayscale voltage generating unit 800 generates a plurality of grayscale voltages related to a brightness of the LCD 1.

The gate driving unit 400 is also referred to as a scan driver. The gate driving unit 400 is connected to the gate line 121 so that it supplies the gate line 121 with a gate signal that is a combination of the gate on voltage Von and the gate off voltage Voff.

The data driving unit 500 is also referred to as a source driver. The data driving unit 500 receives the grayscale voltage supplied from the grayscale voltage generating unit 800, selects the grayscale voltage based on a control of the signal control unit 600, and then supplies the data line 141 with the data voltage Vd.

The signal control unit 600 generates a control signal for controlling the gate driving unit 400, the data driving unit 500, the driving voltage generating unit 700 and the grayscale voltage generating unit 800, and supplies the control signal to the gate driving unit.400, data driving unit 500, driving voltage generating unit 700 and grayscale voltage generating unit 800.

The operation of the LCD 1 will be described more fully hereinafter. The signal control unit 600 is supplied with a RGB grayscale signal R, G, B and an input control signal for controlling a display thereof. In at least one exemplary embodiment of the present invention, the input control signal comprises a vertical synchronizing signal Vsync, a horizontal synchronizing signal Hsync, a main clock CLK, and a data enable signal DE from an outside graphic controller. The signal control unit 600 generates a gate control signal, a data control signal and a voltage selection control signal VSC based on the input control signal. The signal control unit 600 converts the grayscale signal R, G, B according to an operation condition of the liquid crystal panel 300, and transmits the data control signal and the converted grayscale signal R', G', B' to the data driving unit 500. The signal control unit 600 transmits the gate control signal to the gate driving unit 400 and the driving voltage generating unit 700. The signal control unit 600 transmits the voltage selection control signal VSC to the grayscale voltage generating unit 800.

The gate control signal comprises a vertical synchronization start signal STV providing an instruction to start a gate on pulse, a gate clock signal for controlling when to start the gate on pulse and a gate on enable signal OE defining the width of the gate on pulse. The gate on enable signal OE and the gate clock signal CPV are supplied to the driving voltage generating unit 700. The data control signal comprises a horizontal synchronization start signal STH providing an instruction to start inputting the grayscale signal, a load signal LOAD or TP providing an instruction to supply the data line 141 with the corresponding data voltage Vd, a reverse control signal RVS for reversing a polarity of the data voltage, and a data clock signal HCLK.

The grayscale voltage generating unit 800 supplies the grayscale voltage as determined according to the voltage selection control signal VSC supplied to the data driving unit 500.

The gate driving unit 400 supplies the gate on voltage Von to the gate lines 121 sequentially, according to the gate control signal from the signal control unit 600, thereby turning on the TFT T connected to the gate line 121. , The data driving unit 500 supplies the analog data voltage Vd from the grayscale voltage generating unit 800 corresponding to the grayscale signal R',G',B' to the pixel 170 connected to the turned on TFT T to the data line 141, according to the data control signal from the signal control unit 600.The signal control unit 600 controls the gate driving unit 400 so that the pixel 170 supplied with positive polarity data voltage Vd(+) is supplied with positive polarity gate on voltage Von(+) and so that the pixel 170 supplied with the negative polarity data voltage Vd(−) is supplied with the negative polarity gate on voltage Von(−).

The data signal supplied to the data line 141 is applied to the corresponding pixel 170 through the turned on TFT T. In accordance with the above described process, during one frame period, the gate on voltage Von is applied to all the gate lines 121 sequentially, thereby applying the data signals to all the pixels 170. At a next frame period, the reverse control signal RVS is supplied to the driving voltage generating unit 700 and the data driving unit 500, thereby reversing a polarity of all the data signals of the next frame.

As will be described more fully hereinafter with reference to FIGS. 4 to 7, the kickback voltage Vkb varies according to the grayscale and the polarity of the data voltage, and different gate on voltages are applied according to the polarity of the data voltage.

The kickback voltage Vkb is defined as follows.

$$Vkb = \frac{Cgs}{(Clc + Cst + Cgs)}(Von - Voff) \quad \text{Eq. 1}$$

In Eq. 1, Cgs represents a parasitic capacitance between the gate electrode and the source electrode. Clc represents a liquid crystal capacitance, and Cst denotes a storage capacitance.

The liquid crystal capacitance Clc is defined as follows:

$$Clc = \varepsilon_0 \cdot \varepsilon \cdot \frac{A}{d} \quad \text{Eq. 2}$$

In Eq. 2, $\varepsilon_0$ represents the dielectric constant of the liquid crystal in a vacuum, $\varepsilon$ represents the dielectric constant of the liquid crystal, d represents a distance between the pixel electrode and the common electrode, and A denotes an area for which the pixel electrode and the common electrode are overlapped.

Since the liquid crystal has a dielectric anisotropy, the liquid crystal capacitance Clc varies according to an orientation of the liquid crystal. For example, in a normally black PVA mode, a parallel dielectric constant of the liquid crystal $\varepsilon_1$ is smaller than a perpendicular dielectric constant $C_2$. Accordingly, the liquid crystal capacitance Clc is larger in a white state than in a black state. Whereas, the kickback voltage Vkb is smaller in the white state than in the black state.

Figure 5:
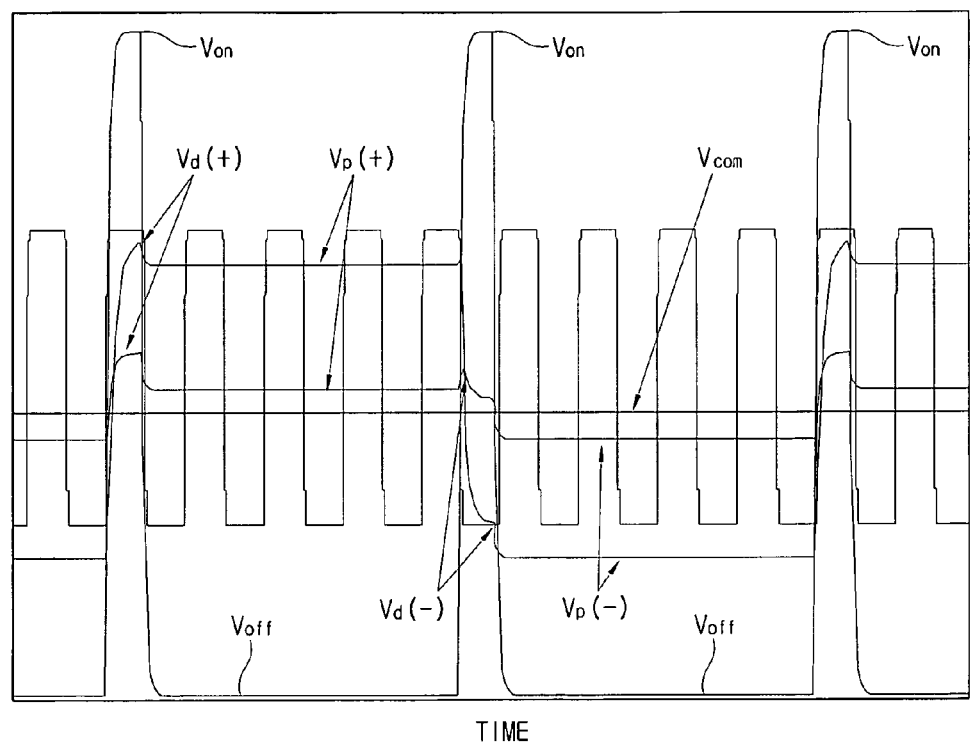
FIG. 5 is a diagram illustrating a simulation result showing how a single gate on voltage is applied.

FIG. 5 is a diagram illustrating a simulation result showing how a single gate on voltage is applied to the LCD having PVA mode. Table 1 contains the data used in the above-mentioned simulation, and Table 2 contains the simulation results.

TABLE 1

| | UNIT | WHITE | BLACK |
|---|---|---|---|
| DIELECTIC CONSTANT | F/m | 6.6 (PERPENDICULAR DIRECTION) | 3.3 (PARALLEL DIRECTION) |
| STORAGE CAPACITANCE Cst | pF | 0.526 | 0.526 |
| LIQUID CRYSTAL CAPACITANCE Clc | pF | 0.553 | 0.310 |
| DATA VOLTAGE Vd | V | 12 TO 0 | 7 TO 5 |
| GATE ON VOLATAGE Von | V | 20 TO −7 | 20 TO −7 |
| PARASITIC CAPACITANCE Cgs | fF | 27 | 27 |

TABLE 2

| | STATE | |
|---|---|---|
| | WHITE | BLACK |
| POSITIVE POLARITY DATA VOLTAGE Vd(+) | 11.51 | 6.97 |
| NEGATIVE POLARITY DATA VOLATGE Vd(−) | 0.04 | 5.03 |
| POSITIVE POLARITY PIXEL VOLTAGE Vp(+) | 10.56 | 5.45 |
| NEGATIVE POLARITY PIXEL VOLATAGE Vp(−) | −1.43 | 3.40 |
| POSITIVE POLARITY KICKBACK VOLTAGE (Vd(+) − Vp(+)) | 0.96 | 1.52 |
| NEGATIVE POLARITY KICKBACK VOLTAGE (Vd(−) − Vp(−)) | 1.47 | 1.63 |
| OPTIMUN COMMON VOLTAGE (Vp(+) + Vp(−))/2 | 4.56 | 4.43 |
| ACTUAL COMMOM VOLTAGE | 4.49 | |
| ACTUAL COMMOM VOLTAGE − OPTIMUN COMMON VOLTAGE | 0.07 | −0.06 |

As shown in Table 1, the liquid crystal capacitance Clc of the black state affected by the parallel dielectric constant $\varepsilon_1$ is smaller than that of the white state affected by the perpendicular dielectric constant F2. According to this, the kickback voltage Vkb of the black state is higher than that of the white state.

As shown in Table 2, the kickback voltage Vkb is higher when the negative polarity gate on voltage Vd(−) is applied than when the positive polarity gate on. voltage Vd(+) is applied. The kickback voltage Vkb varies according to the polarity of the data voltage, and therefore the optimum common voltage Vcom, which is defined as an arithmetic average value of the positive polarity pixel electrode Vp(+) and the negative polarity pixel voltage Vp(−), also varies. The actual value of the common voltage Vcom is obtained through experiment in a mid grayscale. A voltage difference of 0.07V occurs between the common voltage Vcom obtained through experiment and the positive polarity optimum common voltage Vcom. A voltage difference of 0.06V occurs between the common voltage Vcom obtained through experiment and the negative polarity optimum common voltage Vcom. Owing to the voltage difference between the optimum common voltage Vcom and the actual common voltage Vcom, the voltage applied to the liquid crystal is different when the positive polarity gate on voltage Vd(+) is applied, as compared to when the negative polarity gate on voltage Vd(−) is applied, thereby generating flicker and image sticking which causes the quality of the display to deteriorate.

The parasitic capacitance Cgs varies according to a bias voltage Vgs between the gate electrode and the source electrode. Since the parasitic capacitance varies, but is presumed to be a constant, Eq. 1 is not sufficient to explain the difference in the kickback voltage Vkb according to the polarity and the difference in the optimum common voltage Vcom according to the difference of the kickback voltage Vkb.

Figure 6:
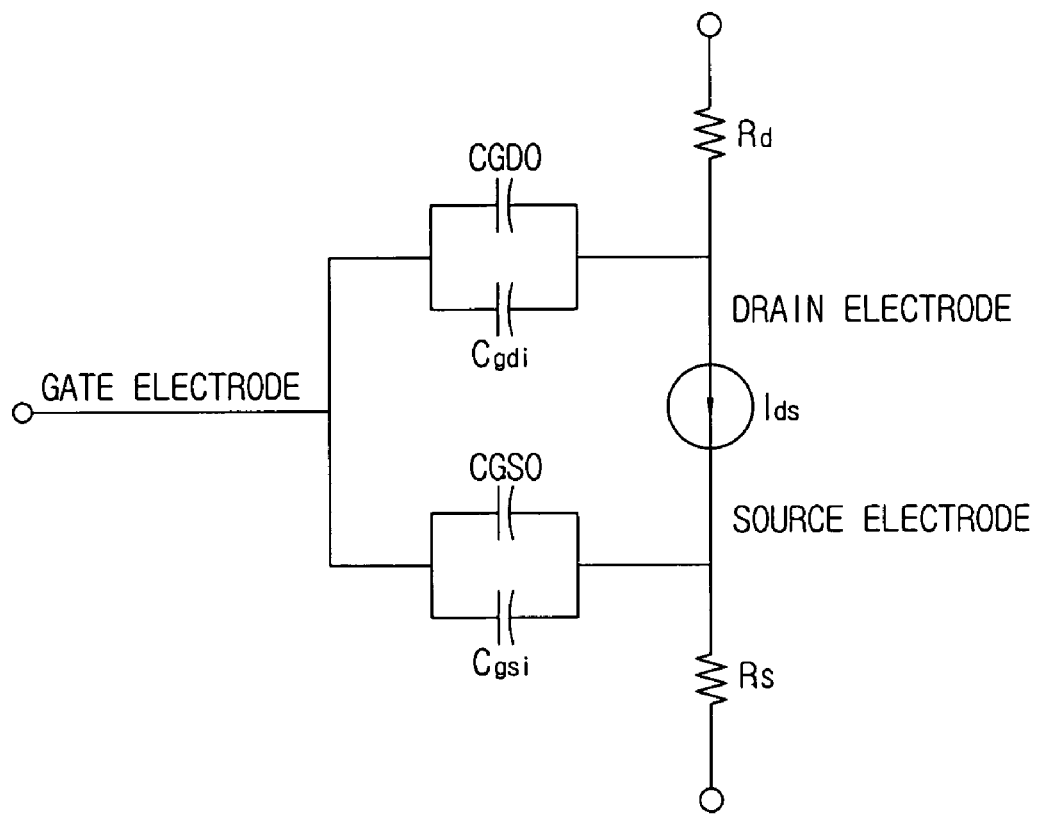
FIG. 6 is an equivalent circuit diagram of a TFT.

FIG. 6 is an equivalent circuit diagram for the TFT. The parasitic capacitance Cgs is defined as a capacitance that is formed between the gate electrode and the source electrode. To this point, only a capacitance CGSO caused by an overlapping of the gate electrode and the source electrode has been considered. However, as shown in FIG. 6, an accumulation of electric charge Cgsi caused by a potential barrier between the semiconductor layer and the insulating layer must also be considered.

Figure 7:
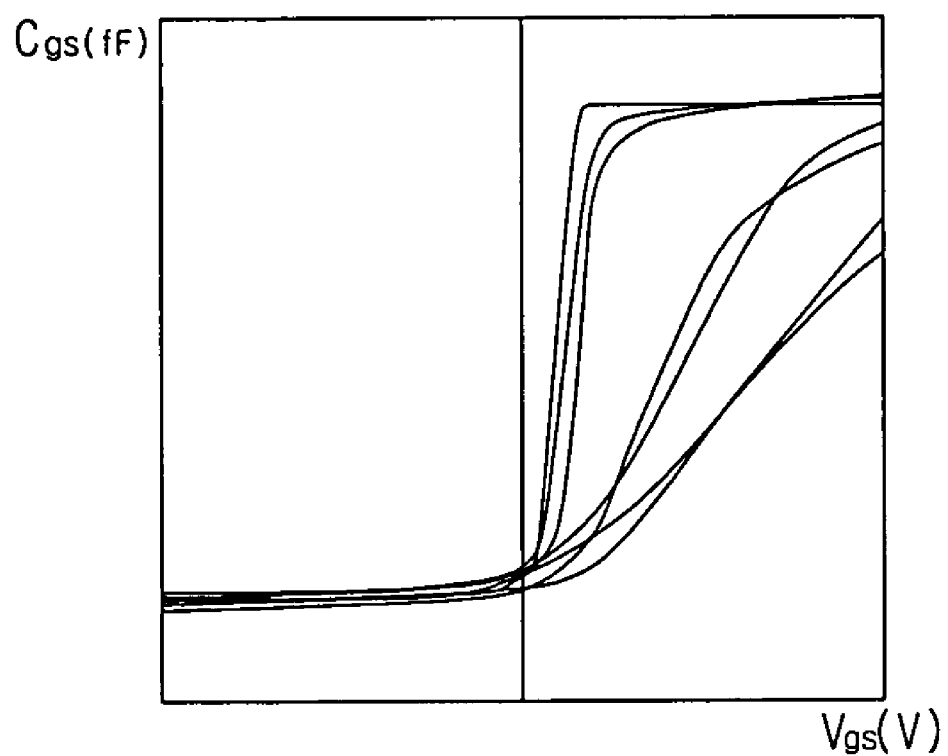
FIG. 7 is a graph showing how a parasitic capacitance Cgs changes with a bias voltage Vgs.
Figure 8:
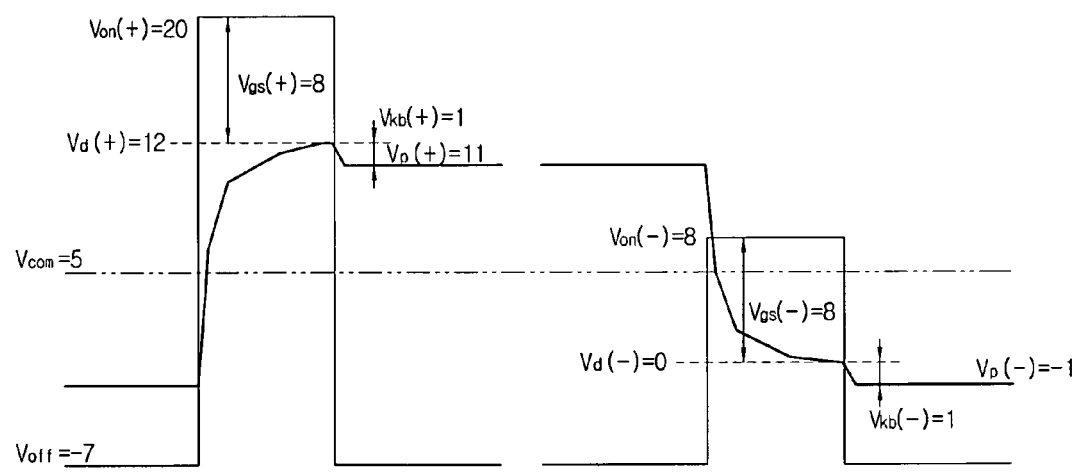
FIG. 8 is a diagram illustrating how a gate on voltage is applied according to the first exemplary embodiment of the present invention.

FIG. 7 is a graph showing how a parasitic capacitance Cgs changes with a bias voltage Vgs. As shown in FIG. 7, the accumulation of electric charge Cgsi is in proportion to the bias voltage Vgs of the TFT. FIG. 7 illustrates a relation between the parasitic capacitance and the bias voltage Vgs before the charging of the pixel is finished, i.e., before the data voltage Vd becomes equal to the pixel voltage Vp. That is, the gate on voltage Von is switched to the gate off voltage Voff, as discussed in DYNAMIC CHARATERIZATION OF a-Si TFT-LCD PIXELS, *IEEE Transactions on Electron Devices*, Vol. 43, No. 1, January 1996, pp. 31-39. Accordingly, the parasitic capacitance Cgs in the on state of the TFT is larger than the Cgs in the off state by Cgs'. Accordingly, an electric charge Qon in the TFT on state and the electric charge Qoff in the TFT off state are defined as follows.

$$Q(\text{on}) = (Vd - V\text{com})Clc + (Vd - V\text{com})Cst + (Vd - V\text{on})(Cgs + Cgs') \quad Q(\text{off}) = (Vp - Vc)Clc + (Vp - Vc)Cst + (Vp - V\text{off})Cgs \quad \text{Eq. 3}$$

Substituting Vkb=Vd−Vp into Eq. 3 and using Q(on)=Q(off), the equation for the kickback voltage Vkb becomes:

$$Vkb = \frac{Cgs}{(Clc + Cst + Cgs)}(Von - Voff) + \frac{Cgs'}{(Clc + Cst + Cgs)}(Von - Vd) \quad \text{Eq. 4}$$

From an examination of Eq. 4 and FIG. 7, reasons why the negative polarity kickback voltage Vkb(−) is larger than the positive polarity kickback voltage Vkb(+) are discernable. One reason is that the kickback voltage Vkb is proportional to the difference (Von−Vd) between the gate on voltage Von and the data voltage Vd. Accordingly, in at least one exemplary embodiment of the present invention, the data voltage Vd is smaller in the negative polarity than in the positive polarity. Another reason is that the kickback voltage Vkb is proportional to the parasitic capacitance Cgs. Accordingly, in at least one exemplary embodiment of the present invention, the parasitic capacitance Cgs is proportional to the bias voltage Vgs, and the bias voltage Vgs is higher in the negative polarity than in the positive polarity. In light of the TFT, the bias voltage Vgs is equal to the difference (Von−Vd) between the gate on voltage Von and the data voltage Vd.

Therefore, the difference (Von−Vd) between the gate on voltage Von and the data voltage Vd can be reduced by applying different gate on voltages Von in the positive polarity and in the negative polarity, thereby reducing the difference of the kickback voltage Vkb difference according to the polarity.

While the positive polarity gate on voltage Von(+) is maintained as 20V, the negative polarity gate on voltage Von(−) is lowered to 8V. In the case that the positive polarity gate on voltage Vd(+) is 12V and the negative polarity gate on voltage Vd(−) is OV in a white state, a difference (Von−Vd) between a gate on voltage Von and a data voltage Vd becomes 8V regardless of the polarity. Accordingly, the kickback voltage Vkb is maintained as 1V regardless of the polarity, thereby equalizing an optimum common voltage Vcom and an actual common voltage Vcom.

Since a frame inversion and a line inversion cause flicker, a dot inversion can be used. In the frame inversion, the polarity of the data voltage Vd is switched by frame. In the line inversion, the polarity of the data voltage Vd is switched by gate line 121. However, in the dot inversion, adjacent pixels have different polarities.

Figure 9:
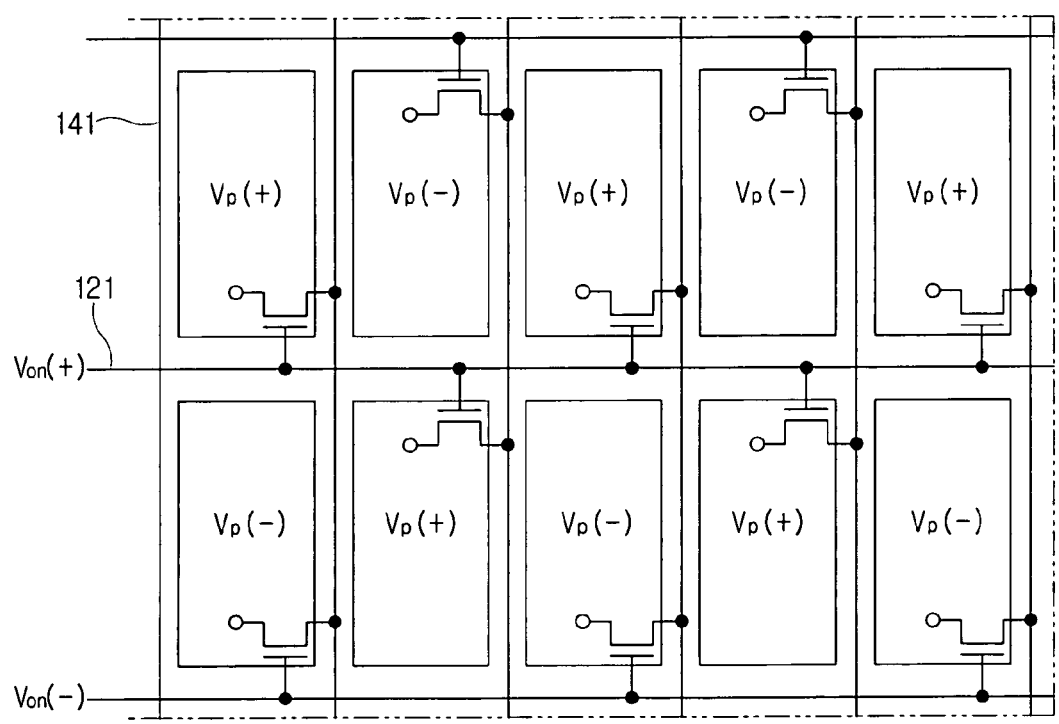
FIG. 9 is a schematic view of a TFT substrate according to the first exemplary embodiment of the present invention.

As shown in FIG. 9, adjacent pixels 170 disposed in an extension direction of the gate line 121 is connected to the gate lines 121 each having different polarity. That is, one pixel is supplied with the positive polarity gate on voltage Von(+), and then another pixel adjacent to the aforementioned pixel is supplied with the negative polarity gate on voltage Von(−). While the positive polarity gate on voltage Von(+) is applied, the data driving unit 500 supplies the pixels 170, connected to the gate line 121 in a zigzag form, with corresponding positive polarity data voltage Vd(+). While the negative polarity gate on voltage Von(−) is applied, the data driving unit 500 supplies the pixels 170, connected to the gate line 121 in a zigzag arrangement, with corresponding negative polarity data voltage Vd(−). In a next frame, the polarity of the data voltage Vd applied across the pixels 170 is switched, and the gate on voltage Von is also switched. With this configuration, the dot inversion is accomplished by applying different gate on voltage Von according to the polarity of the data voltage Vd.

For the frame inversion and the line inversion, the conventional array of the TFT substrate 100 can be used. In at least one exemplary embodiment of the present invention, the gate driving unit 400 supplies different gate on voltages Von according to the polarity of the data voltage Vd.

The white state has been considered in the preceding description of the first exemplary embodiment. The black state will be described hereinafter. In the case where the positive polarity gate on voltage Von(+) is 20V, negative polarity gate on voltage Von(−) is 8V, positive polarity black voltage is 7V, and negative polarity black voltage is 5V, the bias voltage Vgs in the positive polarity becomes 13V (20V−7V) and the bias voltage Vgs in the negative polarity becomes 3V (8V−5V). In the case that 20V of a single gate on voltage Von is applied, the bias voltage Vgs in the negative polarity becomes 15V (20V−5V). Accordingly, a difference in the kickback voltage Vkb becomes larger in the black state. Further, the bias voltage Vgs in the negative polarity is reduced to 3V, deteriorating the charging properties of the pixel electrode.

Figure 10:
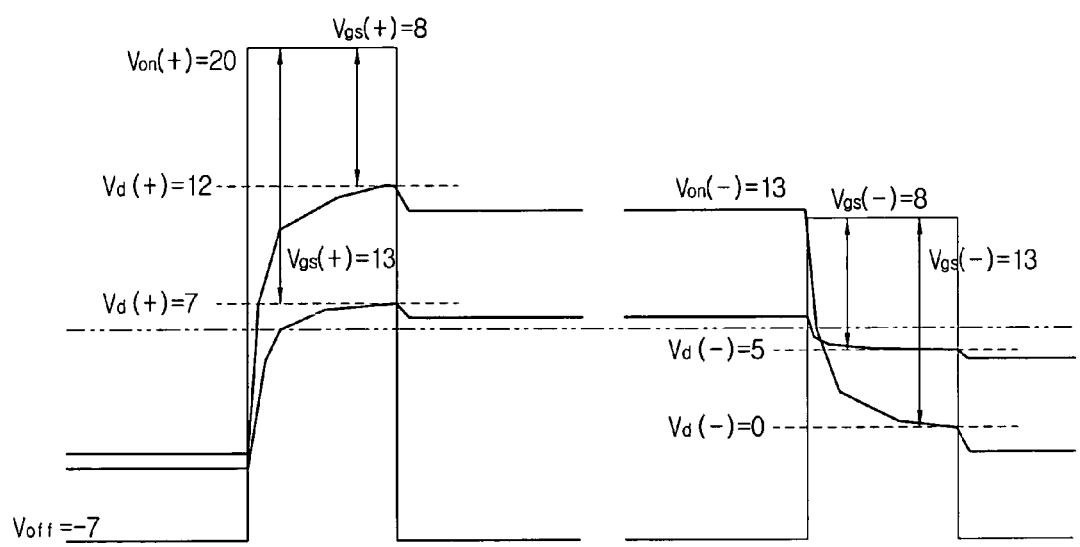
FIG. 10 is a diagram illustrating how a gate on voltage is applied according to a second exemplary embodiment of the present invention.
Figure 11:
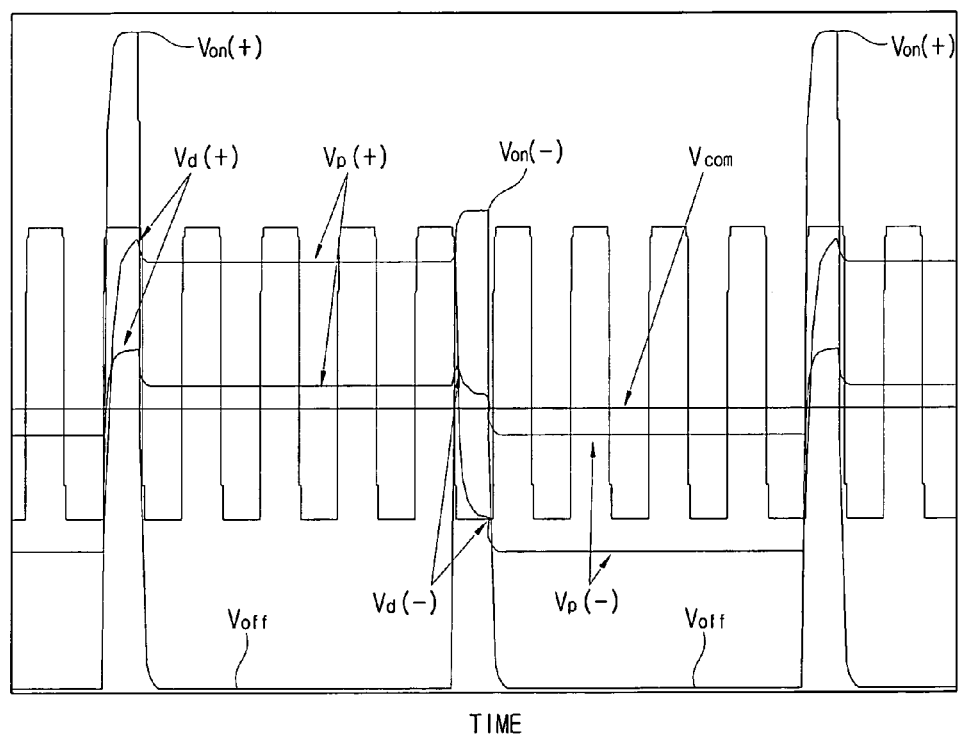
FIG. 11 is a diagram illustrating a simulation result showing how a gate on voltage is applied according to the second exemplary embodiment of the present invention.

Hereinafter, a second exemplary embodiment of the present invention will be described with reference to FIGS. 10 and 11. In the second embodiment, in consideration of a black state, a negative polarity gate on voltage Von(−) is 13V. The bias voltages Vgs in a white state are 8V (20V−12V) in a positive polarity and 13V (13V−0) in a negative polarity, respectively. The bias voltages Vgs in the black state are 13V (20V−7V) in the positive polarity and 8V (13V−5V) in the negative polarity, respectively. The bias voltage Vgs is maintained at least 8V, thereby enhancing a charge in a pixel electrode. Further, the bias voltage Vgs trade offs between the white state and the black state.

The simulation results are shown in Table 3.

TABLE 3

| | STATE | |
|---|---|---|
| | WHITE | BLACK |
| POSITIVE POLARITY DATA VOLTAGE Vd(+) | 11.52 | 6.98 |
| NEGATIVE POLARITY DATA VOLTAGE Vd(−) | 0.24 | 5.20 |
| POSITIVE POLARITY PIXEL VOLTAGE Vp(+) | 10.56 | 5.46 |
| NEGATIVE POLARITY PIXEL VOLTAGE Vp(−) | −0.78 | 4.24 |
| POSITIVE POLARITY KICKBACK VOLTAGE Vkb(+) (Vd(+) − Vp(+)) | 0.96 | 1.52 |
| NEGATIVE POLARITY KICKBACK VOLTAGE Vkb(−) (Vd(−) − Vp(−)) | 1.01 | 0.96 |
| OPTIMUM COMMON VOLATGE (Vp(+) + Vp(−))/2 | 4.89 | 4.85 |
| ACTUAL COMMON VOLTAGE | 4.87 | |
| ACTUAL COMMON VOLTAGE OPTIMUM COMMON VOLATGE | −0.02 | −0.02 |

Where a single gate on voltage Von is applied, the value of the positive polarity kickback voltage Vkb(+) in Table 3 is the same as in Table 2. In contrast, the negative polarity kickback voltage Vkb(−) is reduced from 1.47V to 1.01V in the white state, and from 1.63V to 0.96V in the black state. The difference in the negative polarity kickback voltage Vkb(−)

between the white state and the black state, respectively, is reduced from 0.16V (1.63V–1.47V) to 0.05V (1.01V–0.96V), respectively. The optimum common voltages Vcom are 4.89V in the white state and 4.85V in the black state, and the difference in the optimum voltage is reduced from 0.13V (4.56V–4.43V) to 0.04V. The difference between the optimum common voltage Vcom and the actual common voltage Vcom is 0.02V, and this is much smaller than the 0.06V to 0.07V value shown in Table 2.

In an LCD according to the second exemplary embodiment of the present invention, the difference between the actual common voltage Vcom and the optimum common voltage Vcom is small. Therefore, the difference in the pixel voltage Vp according to the polarity is lessened and therefore flicker and image sticking are also reduced The difference in the gate on voltage Von according to the polarity must take into account a uniform bias voltage Vgs and a minimum bias voltage Vgs for appropriate charging. In addition, the difference in the gate on voltage Von according to the polarity must take into account the value of Von–Voff of Eq. 4. If the negative polarity gate on voltage Von(–) is reduced to make the value of Von–Vd same regardless of the polarity, a value of Von–Voff in the negative polarity is also reduced. The negative polarity kickback voltage Vkb(–) becomes rather smaller than the positive polarity kickback voltage Vkb(+).

In accordance with the above discussion, the actual common voltage Vcom is determined through experimental application of various gate on voltages Von. The difference between the negative polarity gate on voltage Von(–) and the gate off voltage Voff may be about 50 to about 80% of the difference between the positive polarity gate on voltage Von(+) and the gate off voltage Voff.

Figure 12:
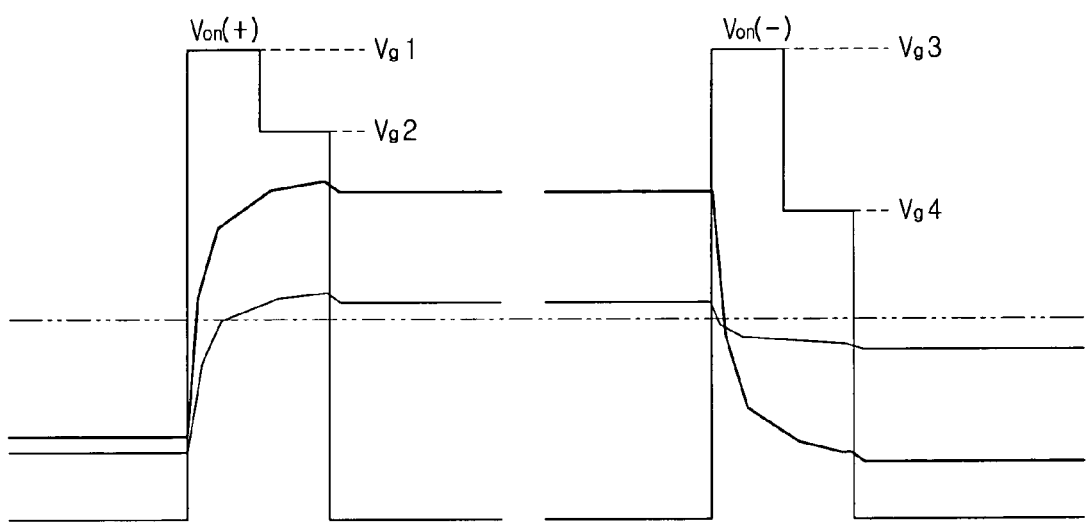
FIG. 12 is a diagram illustrating how a gate on voltage is applied according to a third exemplary embodiment of the present invention.
Figure 13:
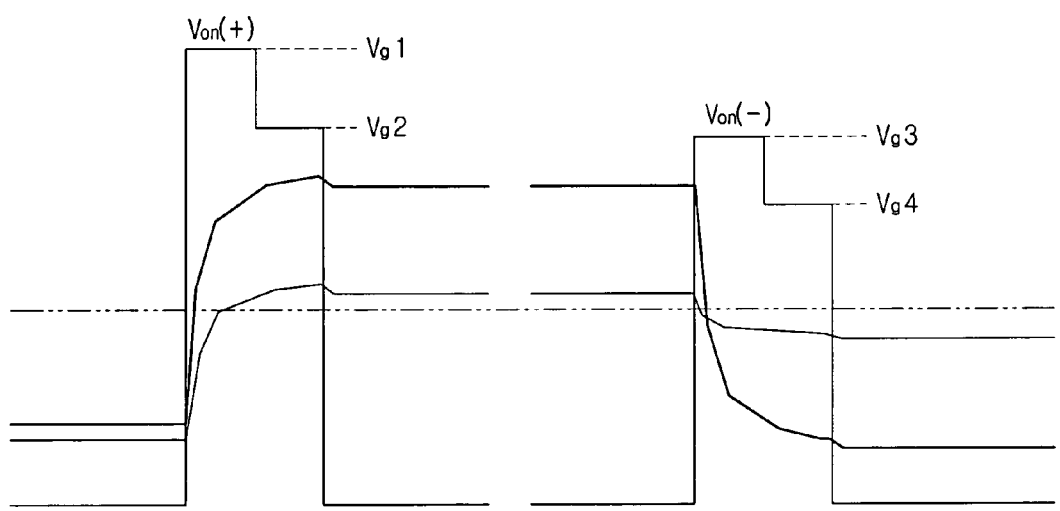
FIG. 13 is a diagram illustrating how a gate on voltage is applied according to a fourth exemplary embodiment of the present invention.

Third and fourth exemplary embodiments of the present invention are described hereinafter with reference to FIGS. 12 and 13. FIG. 12 is a diagram illustrating how a gate on voltage is applied according to a third exemplary embodiment of the present invention. FIG. 13 is a diagram illustrating how a gate on voltage is applied according to a fourth exemplary embodiment of the present invention.

As shown in FIG. 12, a gate on voltage Von has a stepwise distribution that the voltage reduces over time. A positive polarity gate on voltage Von(+) is composed of Vg1 and Vg2 that is lower than Vg1. The negative polarity gate on voltage Von(–) is composed of Vg3 and Vg4 that is lower than Vg3. In at least one exemplary embodiment of the present invention, Vg1 has the same value as Vg2, but Vg4 is lower than Vg3. In the case that the gate on voltage Von has various values, a voltage difference is calculated by an average value of the voltage.

In FIG. 13, Vg3 is lower than Vg1. However, the difference between Vg1 and Vg2 can be larger or smaller than the difference between Vg3 and Vg4.

The present invention can be employed to drive an LCD, including, but not limited to, a large size LCD, high transmission LCD, CSD (color sequential display) having a refreshment rate higher than 120 Hz and the like.

As the LCD becomes large in size, the load in the common voltage Vcom 15 becomes large and therefore a difference between the common voltages Vcom according to a position increases, thereby generating flicker and image sticking which cause the display quality to deteriorate.

If a storage capacitance Clc is reduced, an aperture ratio increases, thereby a high transmission rate LCD can be manufactured. In the case of an LCD having a refreshment rate higher than 120 Hz, the gate on time lessens and the pixel capacitance increases, thereby decreasing the charging rate; therefore, the storage capacitance Clc is reduced.

The CSD employs a method whereby a lightsource unit provides colors of light without a color filter layer 231. In this case, the lightsource unit supplies red, green and blue colors to a liquid crystal panel 300, and may be composed of LEDs (light emitting diode). The lightsource of the CSD repetitively supplies the three colors of light to the liquid crystal panel 300 sequentially by frame. Accordingly, one frame of the LCD using the color filter layer 231 corresponds to three frames of the CSD. Therefore, the CSD requires a refreshment rate higher than 180 Hz for a conventional 60 Hz driving. Due to the high frequency, the gate on time lessens and the pixel capacitance increases, so the storage capacitance Clc is reduced.

According to at least one exemplary embodiment of the present invention, the kickback voltage Vkb according to the polarity becomes constant. Therefore, a difference in the common voltage Vcom can be compensated for and the storage capacitance Clc can be reduced.

While the exemplary embodiments of the present invention have been shown and described in detail for the purpose of illustration, it is understood that the present invention should not be construed as limited thereby. It will be appreciated by those skilled in the art that various changes and modifications to the foregoing exemplary embodiments can be made without departing from the principles and spirit of the invention, the scope of which is defined by the appended claims and their equivalents.

What is claimed is:

1. An LCD comprising:
    a liquid crystal panel having a gate line, a data line, and a pixel connected to the gate line and the data line;
    a grayscale voltage generating unit generating a grayscale voltage;
    a driving voltage generating unit generating a gate off voltage, a positive polarity gate on voltage, and a negative polarity gate on voltage, wherein the negative polarity gate on voltage is lower than the positive polarity gate on voltage;
    a gate driving unit supplying the gate line with the positive polarity gate on voltage or the negative polarity gate on voltage;
    a data driving unit supplying the pixel with a data voltage, wherein the data driving unit is supplied with the grayscale voltage from the grayscale voltage generating unit; and
    a signal control unit controlling the data driving unit to alternately apply a positive polarity data voltage or a negative polarity data voltage to the pixel, and controlling the gate driving unit to apply the positive polarity gate on voltage to the pixel supplied with the positive polarity data voltage and the negative polarity gate on voltage to the pixel supplied with the negative polarity data voltage,
    wherein the positive polarity gate on voltage comprises a first voltage Vg1 and a second voltage Vg2 less than the first voltage Vg1,
    wherein the negative polarity gate on voltage comprises a third voltage Vg3 and a fourth voltage Vg4 less than the third voltage Vg3, and
    wherein the fourth voltage Vg4 is lower than the second voltage Vg2.

2. The LCD of claim 1, wherein a difference between the negative polarity gate on voltage and the gate off voltage is about 50 to about 80% of a difference between the positive polarity gate on voltage and the gate off voltage.

3. The LCD of claim 1, wherein a refreshment rate is higher than 120 Hz.

4. The LCD of claim 1, wherein the negative polarity gate on voltage has a stepwise distribution that the negative polarity gate on voltage is reduced over time.

5. The LCD of claim 4, wherein the positive polarity gate on voltage has a stepwise distribution that the positive polarity gate on voltage is reduced over time.

6. The LCD of claim 1, wherein the first voltage Vg1 is equal to the third voltage Vg3.

7. The LCD of claim 6, wherein a difference between the first voltage Vg1 and the second voltage Vg2 is less than a difference between the third voltage Vg3 and the fourth voltage Vg4.

8. The LCD of claim 1, wherein a difference between the first voltage Vg1 and the second voltage Vg2 is not equal to a difference between the third voltage Vg3 and the fourth voltage Vg4.

9. The LCD of claim 8, wherein the difference between the first voltage Vg1 and the second voltage Vg2 is less than the difference between the third voltage Vg3 and the fourth voltage Vg4.

10. The LCD of claim 1, wherein the liquid crystal panel further comprises a liquid crystal layer, and a liquid crystal in the liquid crystal layer has a negative dielectric anisotropy and aligns vertically in the absence of an electromagnetic field.

11. The LCD of claim 1, further comprising a lightsource unit disposed in the rear of the liquid crystal panel and repetitively supplying red, green and blue colors to the liquid crystal panel sequentially by frame.

12. The LCD of claim 11, wherein an image refreshment rate is higher than 180 Hz.

13. The LCD of claim 1, wherein adjacent pixels disposed in an extension direction of the gate line are connected to different gate lines.

14. The LCD of claim 13, wherein the signal control unit controls the gate driving unit so that the positive polarity gate on voltage and the negative polarity voltage are applied to the adjacent gate lines, respectively.

15. The LCD of claim 14, wherein the signal control unit controls the data driving unit so that the same polarity of data voltage is applied to the pixels connected to the same gate line.

16. A driving method of an LCD including a liquid crystal panel in which a pixel is connected to a gate line and a data line, comprising:
applying a positive polarity gate on voltage across the pixel supplied with a positive polarity data voltage; and
applying a negative polarity gate on voltage that is lower than the positive polarity gate on voltage across the pixel supplied with the negative polarity data voltage,
wherein the positive polarity gate on voltage comprises a first voltage Vg1 and a second voltage Vg2 less than the first voltage Vg1,
wherein the negative polarity gate on voltage comprises a third voltage Vg3 and a fourth voltage Vg4 less than the third voltage Vg3, and
wherein the fourth voltage Vg4 is lower than the second voltage Vg2.

17. The driving method of claim 16, wherein a difference between the negative polarity gate on voltage and a gate off voltage is about 50 to about 80% of a difference between the positive polarity gate on voltage and the gate off voltage.

18. The driving method of claim 16, wherein the adjacent gate lines are supplied with the gate on voltages having opposite polarity, and the adjacent data lines are supplied with the data voltages having opposite polarity.

19. The driving method of claim 16, wherein the negative and positive polarity gate on voltages each have a stepwise distribution that the negative and positive polarity gate on voltages are reduced over time.

20. The driving method of claim 19, wherein a difference between the first voltage Vg1 and the second voltage Vg2 is less than a difference between the third voltage Vg3 and the fourth voltage Vg4.

* * * * *